US012351026B2

(12) United States Patent
Kimura

(10) Patent No.: US 12,351,026 B2
(45) Date of Patent: Jul. 8, 2025

(54) LIGHT EMISSION DEVICE, CONTROL DEVICE AND MOBILE ENTITY

(71) Applicant: KABUSHIKI KAISHA TOKAI RIKA DENKI SEISAKUSHO, Aichi (JP)

(72) Inventor: Aya Kimura, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 19 days.

(21) Appl. No.: 18/272,182

(22) PCT Filed: Dec. 22, 2021

(86) PCT No.: PCT/JP2021/047679
§ 371 (c)(1),
(2) Date: Jul. 13, 2023

(87) PCT Pub. No.: WO2022/153812
PCT Pub. Date: Jul. 21, 2022

(65) Prior Publication Data
US 2024/0131932 A1 Apr. 25, 2024
US 2024/0227560 A9 Jul. 11, 2024

(30) Foreign Application Priority Data
Jan. 18, 2021 (JP) ................ 2021-005854

(51) Int. Cl.
*B60K 35/28* (2024.01)
*B60K 35/21* (2024.01)
(Continued)

(52) U.S. Cl.
CPC ............ *B60K 35/285* (2024.01); *B60K 35/21* (2024.01); *B60K 35/654* (2024.01); *B60W 50/14* (2013.01);
(Continued)

(58) Field of Classification Search
CPC .... B60K 35/285; B60K 35/21; B60K 35/654; B60K 35/60; B60K 2360/782; B60W 50/14
See application file for complete search history.

(56) References Cited

U.S. PATENT DOCUMENTS

2020/0042267 A1\* 2/2020 Yamada ................. G05D 1/021
2020/0273429 A1\* 8/2020 Broy ....................... G06F 3/013
2021/0094419 A1\* 4/2021 Kumon .................... B62D 1/08

FOREIGN PATENT DOCUMENTS

JP 2001-114112 4/2001
JP 2001-309466 11/2001
(Continued)

OTHER PUBLICATIONS

International Search Report issued in International Bureau of WIPO Patent Application No. PCT/JP2021/047679, dated Mar. 22, 2022.
(Continued)

*Primary Examiner* — Curtis A Kuntz
*Assistant Examiner* — James E Munion
(74) *Attorney, Agent, or Firm* — Greenblum & Bernstein, P.L.C.

(57) ABSTRACT

A light emission device is installed in a vehicle capable of changing a degree of involvement of a driver in surroundings monitoring during driving. A light emitter is configured to be located in a gaze stable field of view of the driver when an information display device is located in an effective field of view of the driver. The information display device is disposed on a side of a steering device in the mobile entity. The light emitter is configured to emit light in a manner according to the degree of involvement of the driver in the surroundings monitoring during driving.

10 Claims, 8 Drawing Sheets

(51) Int. Cl.
*B60K 35/60* (2024.01)
*B60K 35/65* (2024.01)
*B60W 50/14* (2020.01)

(52) U.S. Cl.
CPC ........ *B60K 35/60* (2024.01); *B60K 2360/782* (2024.01)

(56) References Cited

FOREIGN PATENT DOCUMENTS

| | | | |
|---|---|---|---|
| JP | 2012210901 A | * | 11/2012 |
| JP | 2014-69671 | | 4/2014 |
| JP | 2019-51784 | | 4/2019 |
| JP | 2019-137179 | | 8/2019 |

OTHER PUBLICATIONS

Written Opinion issued in International Bureau of WIPO Patent Application No. PCT/JP2021/047679, dated Mar. 22, 2022.

* cited by examiner

FIG. 10

| DEGREE OF INVOLVEMENT | CONFIGURATION OF LIGHT EMITTER | EMISSION COLOR | LUMINANCE RANGE IN NIGHTTIME (cd/m^2) | LUMINANCE RANGE IN DAYTIME (cd/m^2) |
|---|---|---|---|---|
| DURING CONTINUATION OF DRIVING MODE IN WHICH NON-INVOLVEMENT OF DRIVER IN SURROUNDINGS MONITORING IS ALLOWED. | FIG. 5 | GREEN | 5-40 | 290-445 |
|  | FIG. 7 | GREEN | 10-75 | 305-480 |
| TRANSITION FROM DRIVING MODE IN WHICH NON-INVOLVEMENT OF DRIVER IN SURROUNDINGS MONITORING IS ALLOWED TO DRIVING MODE IN WHICH INVOLVEMENT OF DRIVER IN SURROUNDINGS MONITORING IS REQUIRED | FIG. 5 | RED | 50-80 | 235-265 |
|  | FIG. 7 | RED | 35-155 | 90-270 |

LIGHT EMISSION DEVICE, CONTROL DEVICE AND MOBILE ENTITY

TECHNICAL FIELD

The presently disclosed subject matter relates to a light emission device installed in a mobile entity capable of changing the degree of involvement of a driver in monitoring the surroundings during driving. The presently disclosed subject matter also relates to a control device installed in a mobile entity capable of changing the degree of involvement of a driver in monitoring the surroundings during driving. The presently disclosed subject matter also relates to a mobile entity capable of changing the degree of involvement of a driver in monitoring the surroundings during driving.

BACKGROUND ART

Japanese Patent Publication No. 2014-69671 discloses a steering device equipped with a steering wheel equipped with a light emitter. The light emitter is controlled to emit light when the vehicle is traveling in the self-driving mode. As a result, the driver is notified that the vehicle is traveling in the self-driving mode through the light emission of the light emitter.

SUMMARY OF INVENTION

Technical Problem

It is demanded to improve the informability of the degree of involvement of the driver in monitoring the surroundings during the traveling of the mobile entity.

Solution to Problem

In order to meet the above demand, a first aspect of the presently-disclosed subject matter provides a light emission device to be installed in a mobile entity capable of changing a degree of involvement of a driver in surroundings monitoring during driving, comprising:
  a light emitter is configured to be located in a gaze stable field of view of the driver when an information display device is located in an effective field of view of the driver, the information display device disposed on a side of a steering device in the mobile entity,
  wherein the light emitter is configured to emit light in a manner according to the degree of involvement.

In order to meet the above demand, a second aspect of the presently-disclosed subject matter provides a mobile entity capable of changing a degree of involvement of a driver in surroundings monitoring during driving, comprising:
  a light emitter is configured to be located in a gaze stable field of view of the driver when an information display device is located in an effective field of view of the driver, the information display device disposed on a side of a steering device in the mobile entity,
  wherein the light emitter is configured to emit light in a manner according to the degree of involvement.

In order to meet the above demand, a third aspect of the presently-disclosed subject matter provides a control device to be installed in a mobile entity capable of changing a degree of involvement of a driver in surroundings monitoring during driving, comprising:
  a reception interface configured to receive an information relating to the degree of involvement; and
  a processor configured to cause a light emitter to emit light based on the information, the light emitter disposed so as to be located in a gaze stable field of view of the driver when an information display device is located in an effective field of view of the driver, the information display device disposed on a side of a steering device in the mobile entity.

According to the configuration according to the above aspect, the light emitter emits light in a manner according to the degree of involvement of the driver in the surroundings monitoring, so that the driver can intuitively grasp the degree of involvement of the driver in the surroundings monitoring. In addition, since the light emitter is disposed so as to be located in the gaze stable field of view of the driver when the information display device is located in the effective field of view of the driver, the light emission of the light emitter can be visually recognized even in a situation in which the driver is gazing at the information display device. Accordingly, it is possible to improve the informability of the degree of involvement of the driver in the surroundings monitoring during the traveling of the mobile entity.

In order to meet the above demand, a fourth aspect of the presently-disclosed subject matter provides a light emission device to be installed in a mobile entity capable of changing a degree of involvement of a driver in surroundings monitoring during driving, comprising:
  a light emitter configured to be located in a peripheral field of view of the driver when an information display device is located in an effective field of view of the driver, the information display device disposed on a side of a steering device in the mobile entity,
  wherein the light emitter is configured to blink in a manner according to the degree of involvement.

In order to meet the above demand, a fifth aspect of the presently-disclosed subject matter provides a mobile entity capable of changing a degree of involvement of a driver in surroundings monitoring during driving, comprising:
  a light emitter configured to be located in a peripheral field of view of the driver when an information display device is located in an effective field of view of the driver, the information display device disposed on a side of a steering device in the mobile entity,
  wherein the light emitter is configured to blink in a manner according to the degree of involvement.

In order to meet the above demand, a sixth aspect of the presently-disclosed subject matter provides a control device to be installed in a mobile entity capable of changing a degree of involvement of a driver in surroundings monitoring during driving, comprising:
  a reception interface configured to receive an information relating to the degree of involvement; and
  a processor configured to cause a light emitter to blink based on the information, the light emitter disposed so as to be located in a peripheral field of view of the driver when an information display device is located in an effective field of view of the driver, the information display device disposed on a side of a steering device in the mobile entity.

According to the configuration according to the above aspect, although the light emitter is located at a position closer to the periphery of the field of view of the driver who is gazing the information display device, the blinking is stronger in visual stimulation than simple light emission. Accordingly, even in a situation in which the driver is gazing at the information display device, the blinking of the light emitter can be visually recognized. As a result, it is possible to improve the informability of the degree of involvement of the driver in the surroundings monitoring during the traveling of the mobile entity. In addition, since the light emitter can be disposed at a position distant from the information display device, the limitation relating to the arrangement of the light emitter can be alleviated.

BRIEF DESCRIPTION OF DRAWINGS

FIG. 10 illustrates a target luminance range in the light emitter of FIGS. 5 and 7.

DESCRIPTION OF EMBODIMENTS

Exemplary embodiments will be described in detail below with reference to the accompanying drawings. In each of the drawings, the scale is appropriately changed in order to make each of the members have a recognizable size.

Figure 1:
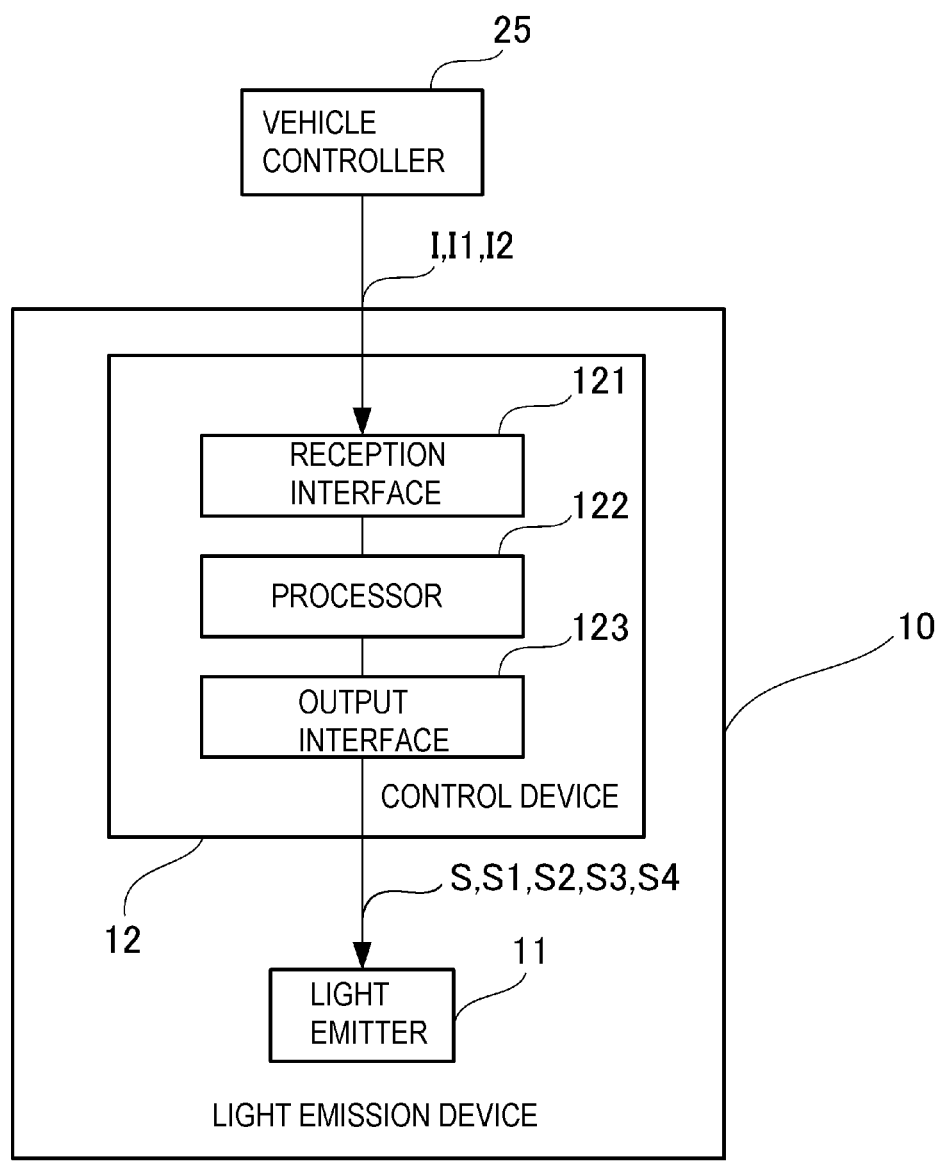
FIG. 1 illustrates an exemplary functional configuration of a light emission device according to an embodiment.
Figure 2:
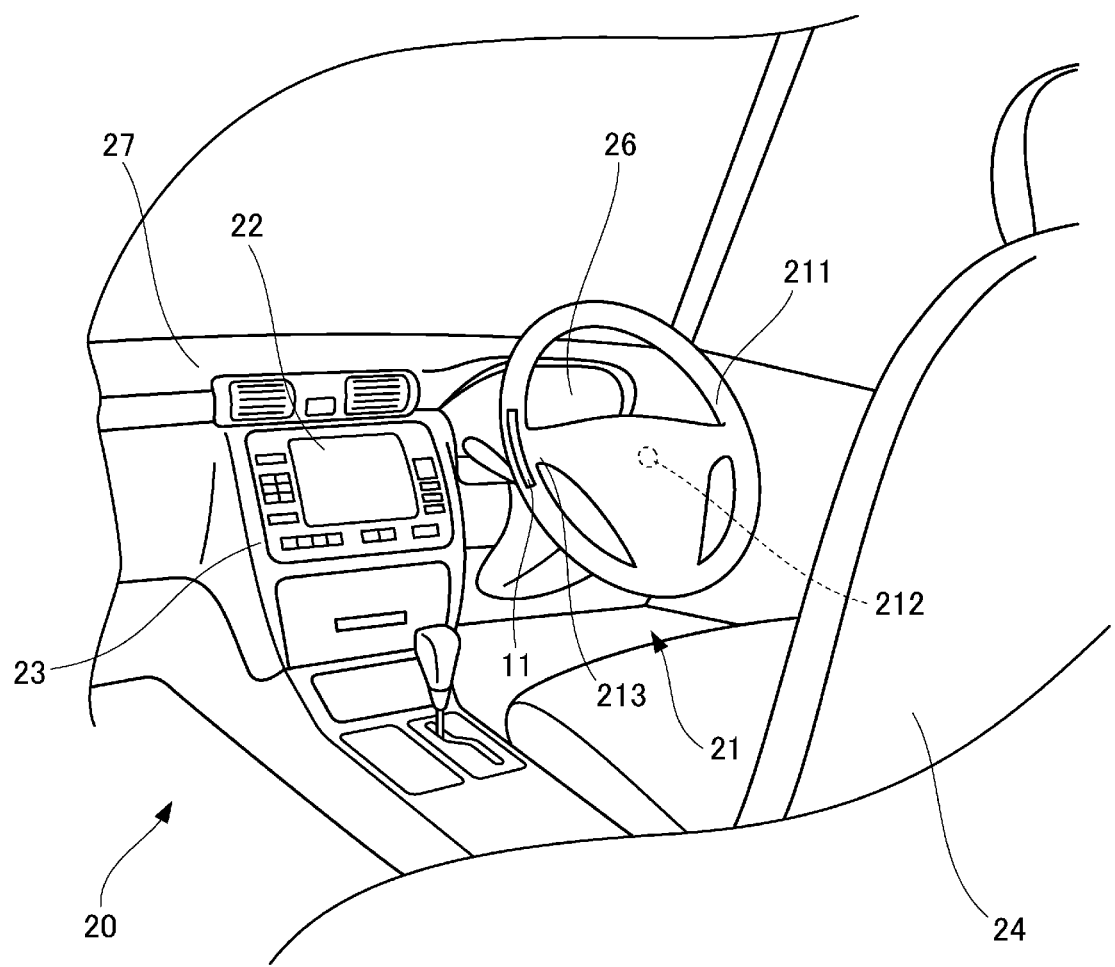
FIG. 2 illustrates a vehicle in which the light emission device of FIG. 1 is to be installed.

FIG. 1 illustrates a specific functional configuration of a light emission device 10 according to an embodiment. The light emission device 10 is installed in a vehicle 20 as illustrated in FIG. 2. The vehicle 20 is an example of a mobile entity.

The vehicle 20 is configured to be capable of changing the degree of involvement of the driver in monitoring the surroundings during driving. The degree of involvement of the driver in monitoring the surroundings can be changed according to the driving mode in which the vehicle 20 travels. The driving mode includes a driving mode for performing a driving support function and a manual driving mode. The term "driving support" used in this specification means control processing that at least partially performs at least one of driving operation (steering operation, acceleration, deceleration), monitoring of a traveling environment, and backup of driving operation. That is, driving support means that includes not only the partial driving support such as a speed keep function, a vehicle to vehicle distance keep function, a collision avoidance braking system function and a lane keeping assist function, but also a full self-driving operation. A request of involvement of the driver or an allowance of non-involvement of the driver in the surroundings monitoring can be determined based on the object to be controlled by the driving support function, the vehicle environment information, and the like. As used in this specification, the term "manual driving" means a state in which an operation performed with a driver's limb is required. In the manual driving mode, involvement of the driver in the surroundings monitoring is requested.

As illustrated in FIG. 2, a steering device 21 and an information display device 22 are disposed in a vehicle 20. The steering device 21 is a device for performing an operation of changing the traveling direction of the vehicle 20. The steering device 21 includes a grip portion 211 and a shaft portion 212. The grip portion 211 is configured to allow a driver to place his/her hand. The shaft portion 212 is rotatable by the grip portion 211. The rotation of the shaft portion 212 is associated with an operation of changing the traveling direction of the vehicle 20. The information display device 22 is a display device for displaying various information such as navigation information and entertainment information. The information display device 22 is disposed on a side of the steering device 21 in the vehicle 20. As used in this specification, the expression "side of the steering device 21" means to include an area located obliquely forward and obliquely rearward of the steering device 21 in addition to an area opposing the side surface of the steering device 21. In this example, the information display device 22 is disposed in a center cluster 23 located obliquely forward of the steering device 21 in the vehicle 20.

As illustrated in FIG. 1, the light emission device 10 includes a light emitter 11. As illustrated in FIG. 2, the light emitter 11 is disposed on a grip portion 211 of the steering device 21. The light emitter 11 is disposed at a position in the grip portion 211 at which the light emitted from the light emitter 11 can be seen when a driver seated in the driver's seat 24 views the information display device 22.

Figure 3:
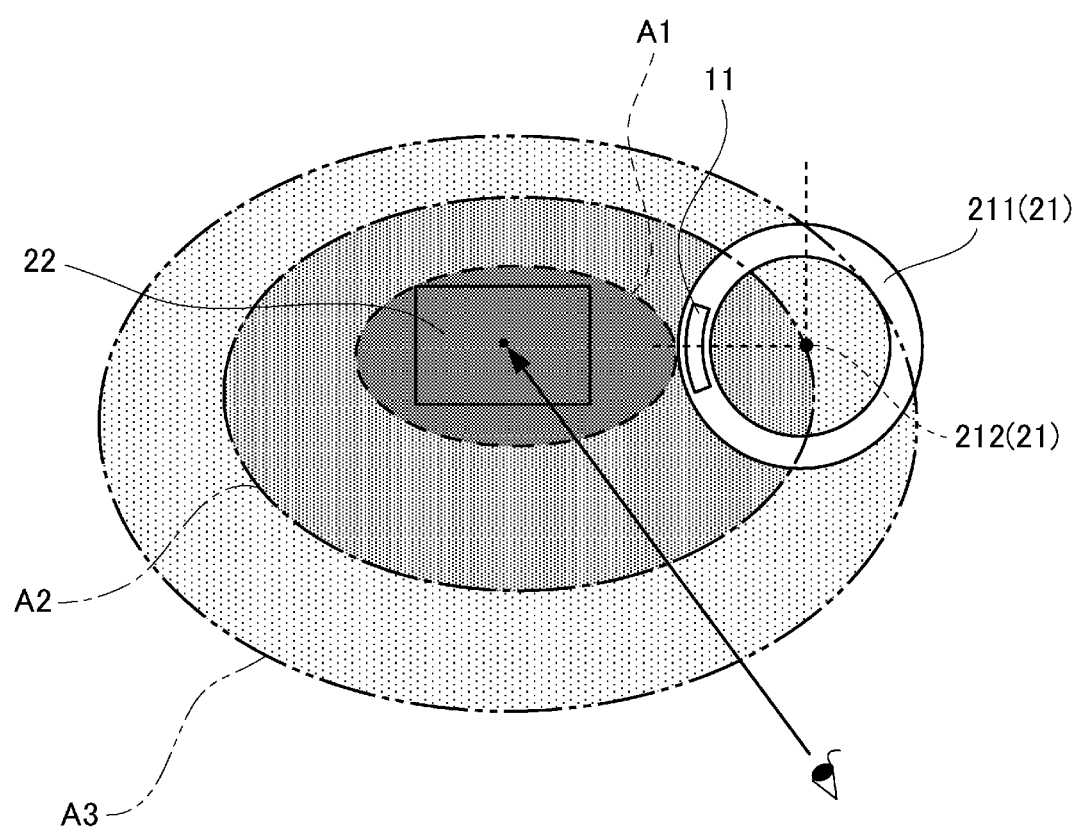
FIG. 3 illustrates an exemplary positional relationship of an information display device and a light emitter as viewed from the driver of the vehicle of FIG. 2.

As illustrated in FIG. 3, the human visual field may be classified into an effective field of view A1, a gaze stable field of view A2, and a peripheral field of view A3. In this specification, the effective field of view A1 is defined as a range capable of accepting information instantaneously. In this specification, the gaze stable field of view A2 is defined as a range capable of accepting information without an excessive search operation. The gaze stable field of view A2 extends so as to surround the effective field of view A1. As used in this specification, the peripheral field of view A3 is defined as the remaining portion of the field of view that extends so as to surround the gaze stable field of view A2.

In this example, the light emitter 11 is disposed so as to be located in the gaze stable field of view A2 of the driver when the information display device 22 is located in the effective field of view A1 of the driver.

As illustrated in FIG. 1, the light emission device 10 includes a control device 12. The control device 12 includes a reception interface 121 and a processor 122. The reception interface 121 is configured as an interface capable of accepting information I relating to the degree of involvement of the driver in monitoring the surroundings during the driving of the vehicle 20. The information I relating to the degree of involvement can be acquired from a vehicle controller 25 for controlling the traveling of the vehicle 20.

In a case where the information I relating to the degree of involvement is in the form of analog data, the reception interface 121 includes an appropriate conversion circuit including an A/D converter. The information I in the form of digital data is subjected to processing performed by the processor 122.

The processor 122 is configured to output a light emitting signal S for causing the light emitter 11 to emit light, based on the information I relating to the degree of involvement, to an output interface 123. The light emitter 11 emits light in a manner corresponding to the degree of involvement based on the light emitting signal S.

The light emitting signal S may be an analog signal or a digital signal. In a case where the light emitting signal S is an analog signal, the output interface 123 is equipped with an appropriate conversion circuit including a D/A converter.

According to the above configuration, the light emitter 11 emits light based on the information I relating to the degree of involvement of the driver in the surroundings monitoring, so that the driver can intuitively grasp the degree of involvement of the driver in the surroundings monitoring. In addition, since the light emitter 11 is disposed so as to be located in the gaze stable field of view A2 of the driver when the information display device 22 is located in the effective field of view A1 of the driver, the light emission of the light emitter 11 can be visually recognized even in a situation in which the driver is gazing at the information display device 22. Accordingly, it is possible to improve the informability of the degree of involvement of the driver in monitoring the surroundings during the driving of the vehicle 20.

The processor 122 may be configured to cause the light emitter 11 to emit light in a different manner according to the degree of involvement of the driver in monitoring the surroundings during the driving of the vehicle 20.

For example, when receiving, by the reception interface 121, the transition information I1 relating to the transition from the driving mode in which non-involvement of the driver in the surroundings monitoring is allowed to the driving mode in which involvement of the driver in the surroundings monitoring is requested, the processor 122 may cause the output interface 123 to output a first light emitting signal S1 for causing the light emitter 11 to emit light in a first manner. The light emitter 11 emits light in a first manner based on the first light emitting signal S1.

In addition, when the continuation information 12 relating to the continuation of the driving mode in which the non-involvement of the driver in the surroundings monitoring is allowed is received by the reception interface 121, the processor 122 may cause the output interface 123 to output a second light emitting signal S2 for causing the light emitter 11 to emit light in the second manner. The light emitter 11 emits light in a second mode different from the first mode based on the second light emitting signal S2.

In each of the first embodiment and the second embodiment, at least one of a light-emitting color, a light-emitting time, and a ratio of a light-emitting time length to a non-light-emitting time length can be set to be different from each other. For example, when the transition information I1 is received, the processor 122 may cause the light emitter 11 to blink in red or yellow. In addition, when the continuation information 12 is received, the processor 122 can cause the light emitter 11 to emit light in blue or green.

According to such a configuration, since the light emission mode of the light emitter 11 is different according to the degree of involvement of the driver in the surroundings monitoring, the driver can intuitively recognize whether the surroundings monitoring is required or not.

Figure 4:
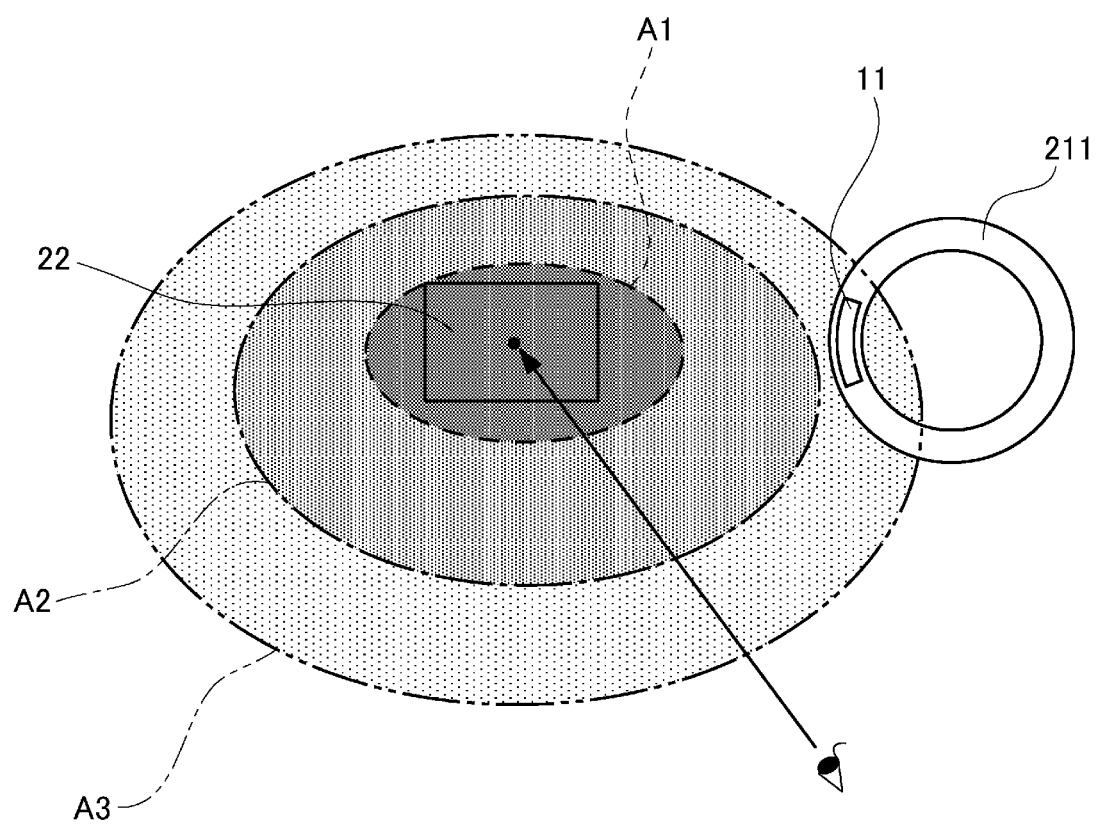
FIG. 4 illustrates another exemplary positional relationship of the information display device and a light emitter as viewed from the driver of the vehicle of FIG. 2.

In the present embodiment, the light emitter 11 is disposed so as to be located in the gaze stable field of view A2 of the driver when the information display device 22 is located in the effective field of view A1 of the driver. However, as illustrated in FIG. 4, the light emitter 11 may be disposed so as to be located in the peripheral field of view A3 of the driver when the information display device 22 is located in the effective field of view A1 of the driver.

In this case, the processor 122 of the control device 12 may be configured to output a light emitting signal S for causing the light emitter 11 to blink, based on the information I relating to the degree of involvement, to the output interface 123. The light emitter 11 blinkes based on the light emitting signal S.

In this example, although the light emitter 11 is located at a position closer to the periphery of the field of view of the driver who is gazing at the information display device 22, the blinking is stronger in visual stimulation than simple light emission. Accordingly, even in a situation in which the driver is gazing at the information display device 22, the blinking of the light emitter 11 can be visually recognized. As a result, it is possible to improve the informability of the degree of involvement of the driver in monitoring the surroundings during the driving of the vehicle 20. In addition, since the light emitter 11 can be disposed at a position further away from the information display device 22, it is possible to alleviate the restriction relating to the arrangement of the light emitter 11.

The processor 122 may cause the light emitter 11 to blink in a different manner according to the degree of involvement of the driver in monitoring the surroundings during the driving of the vehicle 20.

For example, when the transition information I1 is received by the reception interface 121, the processor 122 may cause the output interface 123 to output a third light emitting signal S3 for causing the light emitter 11 to blink in a third manner. The light emitter 11 blinkes in a third manner based on the third light emitting signal S3.

In addition, when the continuation information 12 is received by the reception interface 121, the processor 122 may cause the output interface 123 to output a fourth light emitting signal S4 for causing the light emitter 11 to blink in a fourth manner. The light emitter 11 blinks in a fourth mode different from the third mode based on the fourth light emitting signal S4.

The third embodiment and the fourth embodiment can be set such that at least one of a blinking cycle and a ratio of a light-emitting time length and a non-light-emitting time length in one blinking cycle is different from each other. The third embodiment and the fourth embodiment can be further set so that the emission colors are different from each other. For example, when the transition information I1 is received, the processor 122 causes the light emitter 11 to emit light so that the light emitter 11 blinks in red or yellow and at the first cycle. In addition, when the continuation information 12 is received, the processor 122 can cause the light emitter 11 to emit light so that the light emitter 11 blinks in a second cycle that is blue or green and longer than the first cycle.

According to such a configuration, since the light emission mode of the light emitter 11 is different according to the degree of involvement of the driver in the surroundings monitoring, the driver can intuitively recognize whether the surroundings monitoring is required or not.

Figure 5:
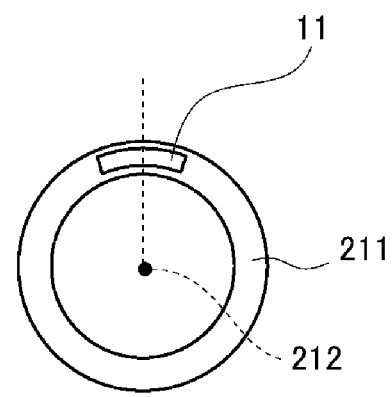
FIG. 5 illustrates the other example of the light emitter.

The shape, arrangement, and number of the light emitters 11 can be appropriately determined. For example, as illustrated in FIG. 3, in an initial state of the steering device 21, the light emitter 11 may be disposed in a 9 o'clock direction of the clock as viewed from the shaft portion 212. Alternatively, as illustrated in FIG. 5, in an initial state of the steering device 21, the light emitter 11 may be disposed in a 12-hour direction of the clock as viewed from the shaft portion 212.

Figure 6:
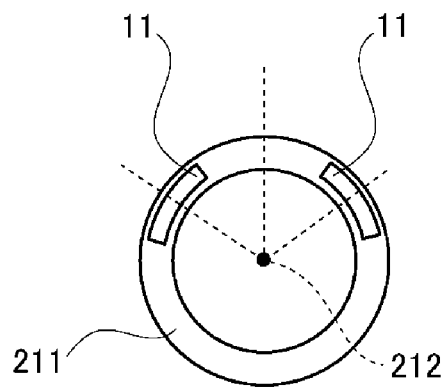
FIG. 6 illustrates the other example of the light emitter.
Figure 7:
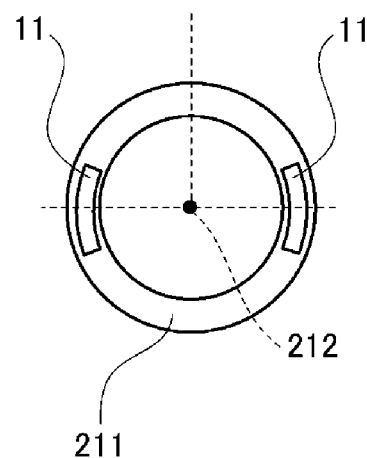
FIG. 7 illustrates the other example of the light emitter.

In addition, the two light emitters 11 may be disposed symmetrically about the shaft portion 212. For example, as illustrated in FIG. 6, in the initial state of the steering device 21, the light emitter 11 may be disposed in each of the 2 o'clock direction and the 10 o'clock direction of the clock as viewed from the shaft portion 212. Alternatively, as illustrated in FIG. 7, in the initial state of the steering device 21, the light emitter 11 may be disposed in each of the 3 o'clock direction and the 9 o'clock direction of the clock as viewed from the shaft portion 212. In this case, it is possible to eliminate the need to change the specification of the light emitter 11 in accordance with the destination (left handle area or right handle area) of the vehicle in which the steering device 21 is installed.

Figure 8:
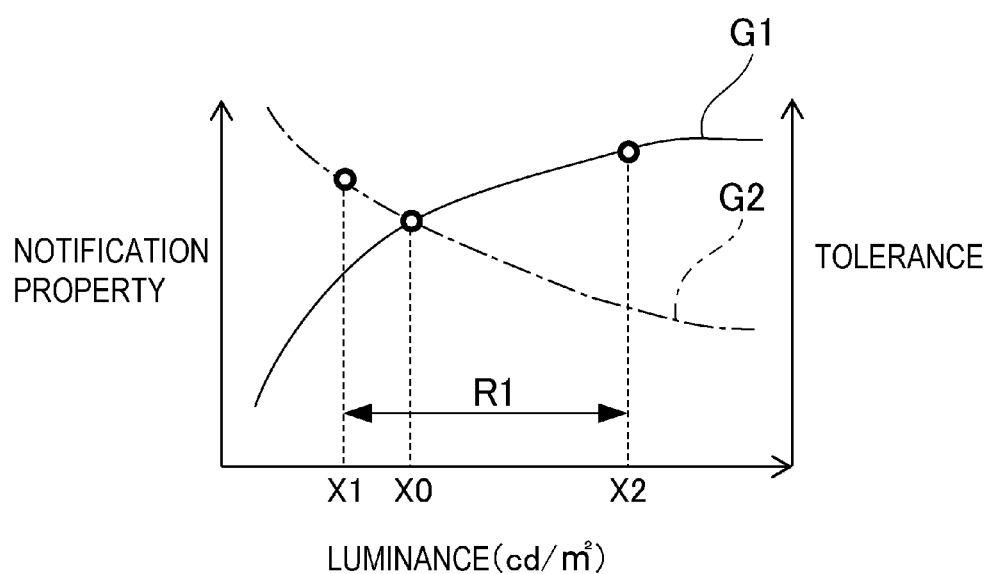
FIG. 8 illustrates a target luminance range of the light emitter that emits light during the continuation of a driving mode in which the non-involvement of the driver in the surroundings monitoring is allowed.
Figure 9:
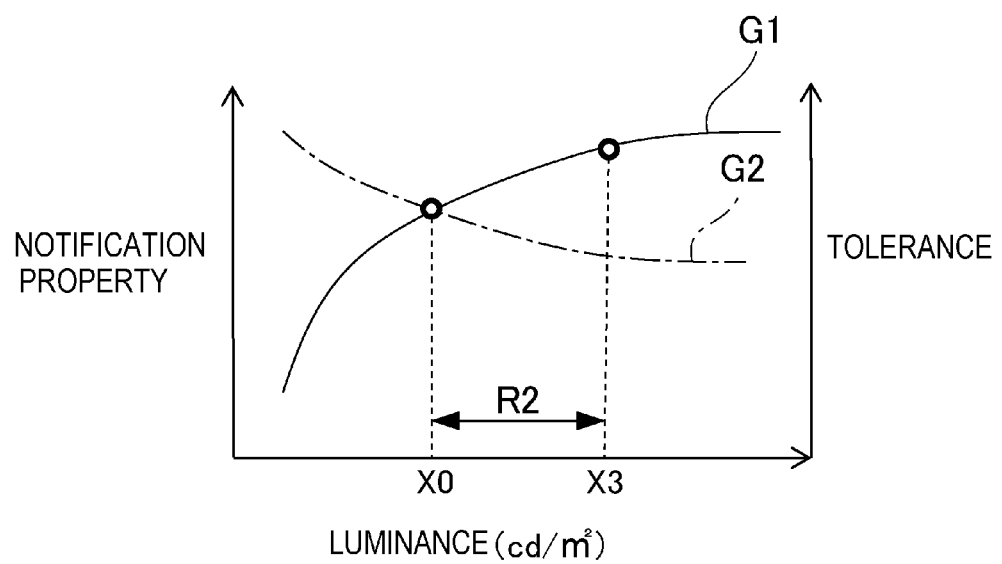
FIG. 9 illustrates a target luminance range of the light emitter that emits light at the time of transition from a driving mode in which non-involvement of the driver in the surroundings monitoring is allowed to a driving mode in which involvement of the driver in the surroundings monitoring is required.

A different target luminance range can be derived from the light emitter 11 in accordance with the degree of involvement of the driver in monitoring the surroundings during the driving of the vehicle 20. For example, FIG. 8 illustrates a target luminance range R1 of the light emitter 11 that emits light during the continuation of a driving mode in which the non-involvement of the driver in the surroundings monitoring is allowed. FIG. 9 illustrates a target luminance range R2 of the light emitter 11 that emits light at the time of transition from a driving mode in which non-involvement of the driver in the surroundings monitoring is allowed to a driving mode in which involvement of the driver in the surroundings monitoring is required.

In FIGS. 8 and 9, the horizontal axis represents the luminance value of the light emitter 11. The left vertical axis represents the degree to which the driver can easily recognize the light emitted from the light emitter 11, i.e., the notification property. The right vertical axis represents the degree to which the driver can tolerate the annoyance caused by the light emitted from the light emitter 11, i.e., the tolerance.

A graph G1 indicated by a solid line illustrates a relationship between a luminance value and a notification property of the light emitter 11 at the time of light emission. It is understood that when the luminance value of the light emitter 11 is increased, the notification property is increased. That is, when the luminance value of the light emitter 11 is increased, the driver can easily recognize the light emitted from the light emitter 11. On the other hand, a graph G2 indicated by a dashed line illustrates a relationship between the luminance value and the tolerance of the light emitter 11 at the time of light emission. It is understood that when the luminance value of the light emitter 11 is increased, the tolerance is lowered. That is, when the luminance value of the light emitter 11 is increased, the driver tends to be annoyed with the light emission of the light emitter 11. The luminance value X0 at which the graph G1 and the graph G2 intersect each other indicates a luminance value in which both the notification property and the tolerance are considered. That is, as the luminance value is lower than the luminance value X0, the higher the tolerance is prioritized, whereas as the luminance value is higher than the luminance value X0, the higher the notification property is prioritized.

For example, as illustrated in FIG. 8, the target luminance range R1 of the light emitter 11 that emits light during the continuation of the driving mode in which the driver is allowed to not be involved in the surroundings monitoring can be set to a target luminance range in consideration of the tolerance in addition to the notification property. Specifically, the target luminance range R1 can be set to a luminance range from a luminance value X1 lower than the luminance value X0 to a luminance value X2. The values of X1 and X2 can be appropriately determined.

That is, during the continuation of the driving mode in which the non-involvement of the driver in the surroundings monitoring is allowed, the target luminance range R1 is set in consideration of not only the ease of recognition but also the no annoyance, so that the driver can confirm the continuation of the driving mode, and can reduce the annoyance caused by the light emitted from the light emitter 11.

On the other hand, as illustrated in FIG. 9, the target luminance range R2 of the light emitter 11 that emits light when transitioning from a driving mode in which non-involvement of the driver in the surroundings monitoring is allowed to a driving mode in which involvement of the driver in the surroundings monitoring is required can be set to a target luminance range giving priority to the notification property. Specifically, the target luminance range R2 can be set to a luminance range from the luminance value X0 to the luminance value X3. The value of X3 can be appropriately determined.

That is, in a case where a transition is made from a driving mode in which non-involvement of the driver in the surroundings monitoring is allowed to a driving mode in which involvement of the driver in the surroundings monitoring is required, since the target luminance range R2 giving priority to the ease of recognition is set, the driver can more reliably grasp the transition of the driving mode.

FIG. 10 illustrates specific numerical values of the target luminance range obtained based on the derivation methods illustrated in FIGS. 8 and 9. In this example, a target luminance range during the night and day of the light emitter 11 having the configuration illustrated in FIG. 5 or FIG. 7 and emitting green light or red light is illustrated.

The target luminance range may be set higher at the time of transition from the driving mode in which the non-involvement of the driver in the surroundings monitoring is allowed to the driving mode in which the involvement of the driver in the surroundings monitoring is required than during the continuation of the driving mode in which the non-involvement of the driver in the surroundings monitoring is allowed. For example, as illustrated in FIG. 10, the target luminance range of the light emitter 11 during the night time can be set higher at the time of transition from the driving mode in which the non-involvement of the driver in the surroundings monitoring is allowed to the driving mode in which the involvement of the driver in the surroundings monitoring is required than during the continuation of the driving mode in which the non-involvement of the driver in the surroundings monitoring is allowed.

On the other hand, the target luminance range of the light emitter 11 in the daytime can be set lower at the time of transition from the driving mode in which the non-involvement of the driver in the surroundings monitoring is allowed to the driving mode in which the involvement of the driver in the surroundings monitoring is required than at the time of continuation of the driving mode in which the non-involvement of the driver in the surroundings monitoring is allowed. In this example, the light emitter 11 is caused to emit green light during the continuation of the driving mode in which the non-involvement of the driver in the surroundings monitoring is allowed, and the light emitter 11 is caused to emit red light during the transition from the driving mode in which the non-involvement of the driver of the surroundings monitoring is allowed to the driving mode in which the involvement of the driver of the surroundings monitoring is required. In a daytime in which the interior of the vehicle 20 is bright, since green color is less likely to be recognized than red color, the target luminance range during the continuation of the driving mode in which the non-involvement of the driver in the surroundings monitoring is allowed can be set higher. That is, the target luminance range can be set depending on the difference in the emission color of the light emitter 11.

The target luminance range can be set depending on the configuration of the light emitter 11. For example, as illustrated in FIG. 10, during the continuation of the driving mode in which the non-involvement of the driver in the surroundings monitoring is allowed, the target luminance range in both the daytime and the nighttime can be set higher in the light emitter 11 illustrated in FIG. 7 than in the light emitter 11 illustrated in FIG. 5. Similarly, at the time of transition from the driving mode in which non-involvement of the driver in the surroundings monitoring is allowed to the driving mode in which non-involvement of the driver in the surroundings monitoring is required, the target luminance range in both the daytime and the nighttime can be set higher in the light emitter 11 illustrated in FIG. 7 than in the light emitter 11 illustrated in FIG. 5. Since the configuration in FIG. 7 is less likely to be recognized than the configuration in FIG. 5 with respect to the light emission of the light emitter 11, the target luminance range of the configuration in FIG. 7 can be set higher.

The target luminance range may be set depending on the surrounding environment of the vehicle 20. For example, as illustrated in FIG. 10, during the continuation of the driving mode in which the driver is allowed to not be involved in the surroundings monitoring, the daytime target luminance range can be set higher than the nighttime target luminance range. Similarly, at the time of transition from the driving mode in which non-involvement of the driver in the surroundings monitoring is allowed to the driving mode in which involvement of the driver in the surroundings monitoring is required, the target luminance range in the daytime can be set higher than the target luminance range in the nighttime. Since the interior of the vehicle 20 is brighter during the daytime than during the nighttime, so that the light emitted from the light emitter 11 is less likely to be recognized, the target luminance range during the daytime can be set higher.

It should be noted that a similar result is derived for the light emitter 11 having the configuration illustrated in FIG. 6 instead of the configuration illustrated in FIG. 7.

The processor 122 having each function described above can be implemented by a general-purpose microprocessor operating in cooperation with a general-purpose memory. Examples of the general-purpose microprocessor include a CPU, an MPU, and a GPU. Examples of the general-purpose memory include a ROM and a RAM. In this case, a computer program for executing the above-described processing can be stored in the ROM. The ROM is an example of a storage medium having stored a computer program. The general-purpose microprocessor designates at least a part of the computer program stored in the ROM, loads the program on the RAM, and executes the processing described above in cooperation with the RAM. The above-described computer program may be pre-installed in the general-purpose memory, or may be downloaded from an external server device via a wireless communication network and then installed in the general-purpose memory. In this case, the external server device is an example of a storage medium having stored a computer program.

The processor 122 may be implemented by an exclusive integrated circuit capable of executing the above-described computer program, such as a microcontroller, an ASIC, and an FPGA. In this case, the above-described computer program is pre-installed in a memory element included in the exclusive integrated circuit. The memory element is an example of a storage medium having stored a computer program. The processor 122 may also be implemented by a combination of the general-purpose microprocessor and the exclusive integrated circuit.

The above embodiments are merely illustrative for facilitating understanding of the gist of the presently disclosed subject matter. The configuration according to each of the above embodiments can be appropriately modified or changed without departing from the gist of the presently disclosed subject matter.

The light emitter 11 can be realized by a semiconductor light emitting element, a side-emitting type optical fiber, or the like. Examples of the semiconductor light emitting element include a light-emitting diode, a laser diode, and an EL element.

The light emitter 11 is disposed on a grip portion 211 of the steering device 21. However, as long as the light emitter 11 is located in the gaze stable field of view A2 or the peripheral field of view A3 of the driver when the information display device 22 is located in the effective field of view A1 of the driver, the light emitter 11 may be disposed in a position different from the grip portion 211 in the vehicle 20. For example, as illustrated in FIG. 2, the light emitter 11 may be disposed on a spoke 213 connecting the grip portion 211 and the shaft portion 212 in the steering device 21. Alternatively, the light emitter 11 may be disposed in a position different from the steering device 21. For example, the light emitter 11 may be disposed at a position adjacent to the information display device 22 of the center cluster 23, a meter panel 26, or the like.

The information display device 22 is disposed in the center cluster 23. However, the information display device 22 may be disposed at a different position as long as it is disposed on the side of the steering device 21. For example, the information display device 22 may be disposed on a dashboard 27 illustrated in FIG. 2. In such a configuration, too, by disposing the light emitter 11 so as to be located in the gaze stable field of view A2 or the peripheral field of view A3 of the driver when the information display device 22 is located in the effective field of view A1 of the driver, it is possible to improve the informability of the degree of involvement of the driver in the surroundings monitoring during the driving of the vehicle 20.

The light emission device 10 may be installed in a mobile entity other than the vehicle 20. Examples of such mobile entities include railways, ships, and aircrafts.

The present application is based on Japanese Patent Application No. 2021-005854 filed on Jan. 18, 2021, the entire contents of which are incorporated herein by reference.

The invention claimed is:

1. A light emission device to be installed in a mobile entity configured to change a degree of involvement of a driver in surroundings monitoring during driving, comprising:
    a light emitter configured to be located in a gaze stable field of view of the driver when an information display device is located in an effective field of view of the driver, the information display device disposed on a side of a steering device in the mobile entity, the gaze stable field of view being between the effective field of view and a peripheral field of view of the driver,
    wherein the light emitter is configured to emit light in a manner according to the degree of involvement.

2. A light emission device to be installed in a mobile entity configured to change a degree of involvement of a driver in surroundings monitoring during driving, comprising:
    a light emitter configured to be located in a peripheral field of view of the driver when an information display device is located in an effective field of view of the driver, the information display device disposed on a side of a steering device in the mobile entity, the peripheral field of view being outside a gaze stable field of view of the driver, wherein the light emitter is configured to blink in a manner according to the degree of involvement.

3. The control device according to claim 1, wherein the light emitter is configured to be disposed in the steering device.

4. The control device according to claim 3, wherein the light emitter is configured to be disposed in a grip portion on which the driver's hand is placed in the steering device.

5. The control device according to claim 1, wherein the light emitter is configured to emit light at a time of transition from a driving mode in which non-involvement of the driver in the surroundings monitoring is allowed to a driving mode in which involvement of the driver in the monitoring surroundings is required.

6. The control device according to claim 1, wherein the light emitter is configured to emit light during a continuation of a driving mode in which non-involvement of the driver in the surroundings monitoring is allowed.

7. A control device to be installed in a mobile entity configured to change a degree of involvement of a driver in surroundings monitoring during driving, comprising:

a reception interface configured to receive an information relating to the degree of involvement; and a processor configured to cause a light emitter to emit light based on the information, the light emitter disposed so as to be located in a gaze stable field of view of the driver when an information display device is located in an effective field of view of the driver, the information display device disposed on a side of a steering device in the mobile entity, the gaze stable field of view being between the effective field of view and a peripheral field of view of the driver.

8. A control device to be installed in a mobile entity configured to change a degree of involvement of a driver in surroundings monitoring during driving, comprising:

a reception interface configured to receive an information relating to the degree of involvement; and a processor configured to cause a light emitter to blink based on the information, the light emitter disposed so as to be located in a peripheral field of view of the driver when an information display device is located in an effective field of view of the driver, the information display device disposed on a side of a steering device in the mobile entity, the peripheral field of view being outside a gaze stable field of view of the driver.

9. A mobile entity configured to change a degree of involvement of a driver in surroundings monitoring during driving, comprising:

a light emitter configured to be located in a gaze stable field of view of the driver when an information display device is located in an effective field of view of the driver, the information display device disposed on a side of a steering device in the mobile entity, the gaze stable field of view being between the effective field of view and a peripheral field of view of the driver, wherein the light emitter is configured to emit light in a manner according to the degree of involvement.

10. A mobile entity configured to change a degree of involvement of a driver in surroundings monitoring during driving, comprising:

a light emitter configured to be located in a peripheral field of view of the driver when an information display device is located in an effective field of view of the driver, the information display device disposed on a side of a steering device in the mobile entity, the peripheral field of view being outside a gaze stable field of view of the driver, wherein the light emitter is configured to blink in a manner according to the degree of involvement.

* * * * *